United States Patent
Wang et al.

(10) Patent No.: US 6,986,685 B2
(45) Date of Patent: Jan. 17, 2006

(54) PHOTO PRINTER HAVING A DETACHABLE CONNECTION MODULE

(75) Inventors: Le-Jen Wang, Taipei Hsien (TW); Chun-Ying Tu, Taipei (TW)

(73) Assignee: Hi-Touch Imaging Technologies Co., Ltd., Pan-Chiao (TW)

( * ) Notice: Subject to any disclaimer, the term of this patent is extended or adjusted under 35 U.S.C. 154(b) by 0 days.

(21) Appl. No.: 10/708,538

(22) Filed: Mar. 10, 2004

(65) Prior Publication Data
US 2005/0112950 A1    May 26, 2005

(30) Foreign Application Priority Data
Nov. 20, 2003 (TW) .............................. 92132551 A

(51) Int. Cl.
*H01R 13/62* (2006.01)

(52) U.S. Cl. ...................................... 439/638; 439/945

(58) Field of Classification Search ................ 439/638, 439/928, 915, 945
See application file for complete search history.

(56) References Cited

U.S. PATENT DOCUMENTS

| | | | | |
|---|---|---|---|---|
| 5,311,397 A | * | 5/1994 | Harshberger et al. ........ | 439/928 |
| 6,457,647 B1 | * | 10/2002 | Kurihashi et al. .......... | 439/945 |
| 6,733,329 B2 | * | 5/2004 | Yang .......................... | 439/638 |
| 6,744,634 B2 | * | 6/2004 | Yen ............................ | 439/660 |

* cited by examiner

*Primary Examiner*—Renee Luebke
*Assistant Examiner*—James R. Harvey
(74) *Attorney, Agent, or Firm*—Winston Hsu

(57) ABSTRACT

A photo printer includes a housing, a circuit board having a first set of female conducting terminals and a control circuit for controlling the operation of the printer, a connection module having a connector that contains both a first set of male conducting terminals for engaging with the first set of female conducting terminals and a second set of female conducting terminals, and an external card for storing data having a second set of female conducting terminals for engaging with the first set of female conducting terminals.

4 Claims, 5 Drawing Sheets

PHOTO PRINTER HAVING A DETACHABLE CONNECTION MODULE

BACKGROUND OF INVENTION

1. Field of the Invention

The invention relates to a printer, and more particularly, to a photo printer having a detachable connection module.

2. Description of the Prior Art

With the rapid development of digital technology, image-capturing devices, such as mobile phones and digital still cameras, have become lower priced and more convenient in portability, and as a result, become an increasing part of peoples daily life. In order to store moving or static images captured by the image-capturing device, a compact flash card (CF card) which stores those images in digital format (e.g. JPG format) is a widely-used storage medium. Then, the CF card with those images can connect to a computer to do further processing so as to improve image effects. Certainly, the compact flash card can connect to a photo printer to print the images on a medium such as paper.

Please refer to FIG. 1, which is a schematic diagram of a conventional CF card 20 with grooves 22 connecting with a connector 14 according to prior art. The printer 10 includes a circuit board 12 with a connector 14. The connector 14 includes a set of conducting terminals 16 for engaging with the grooves 22 of the CF card 20 in order to transmit the data stored in the CF card 20. The data can then be processed by using chips on the circuit board 12.

Generally speaking, the position where the grooves 22 of the CF card 20 and the connector 14 are engaged is apt to be broken, especially if a careless user tries to insert the CF card 20 with force when the grooves 22 are not aligned with the conducting terminals 16. Such a movement could easily cause the conducting terminals 16 to snap. If the conducting terminals 16 are broken, it is very inconvenient for users to disassemble the printer 10 to replace the connector 14 with the broken conducting terminals 16.

SUMMARY OF INVENTION

It is therefore a primary objective of the claimed invention to provide a printer having a detachable connection module to solve the above-mentioned problem.

According to the claimed invention, a photo printer includes a housing, a circuit board installed within the housing comprising a control circuit for controlling an operation of the printer and a first set of female conducting terminals, a connection module comprising an adapter which comprises a first set of male conducting terminals for engaging with the first set of female conducting terminals, and a second set of male conducting terminals, and an external card for storing data comprising a second set of female conducting terminals for engaging with the second set of male conducting terminals.

These and other objectives of the claimed invention will no doubt become obvious to those of ordinary skill in the art after reading the following detailed description of the invention, which is illustrated in the various figures and drawings.

DETAILED DESCRIPTION

Figure 1:
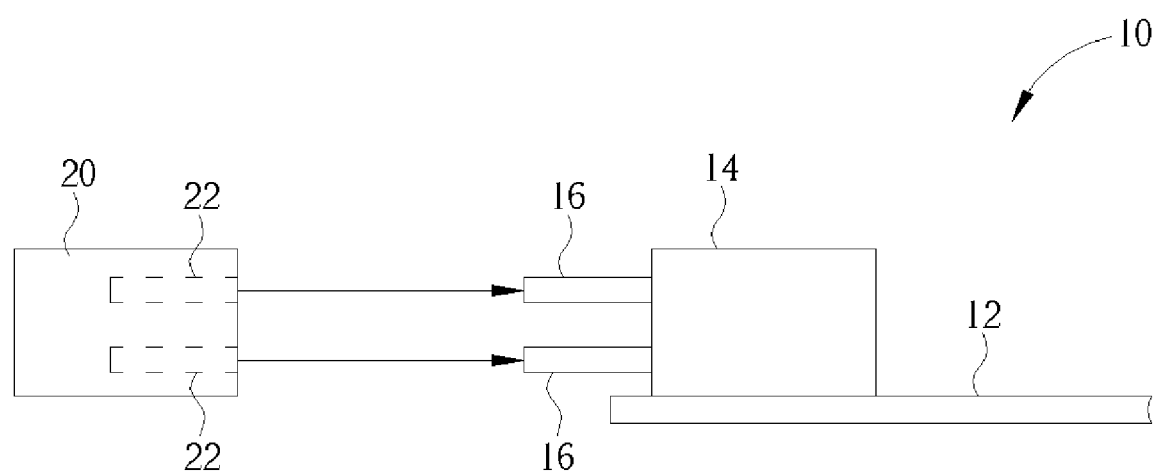
FIG. 1 is a schematic diagram of a slot of a conventional CF card connecting with a connector according to prior art.
Figure 2:
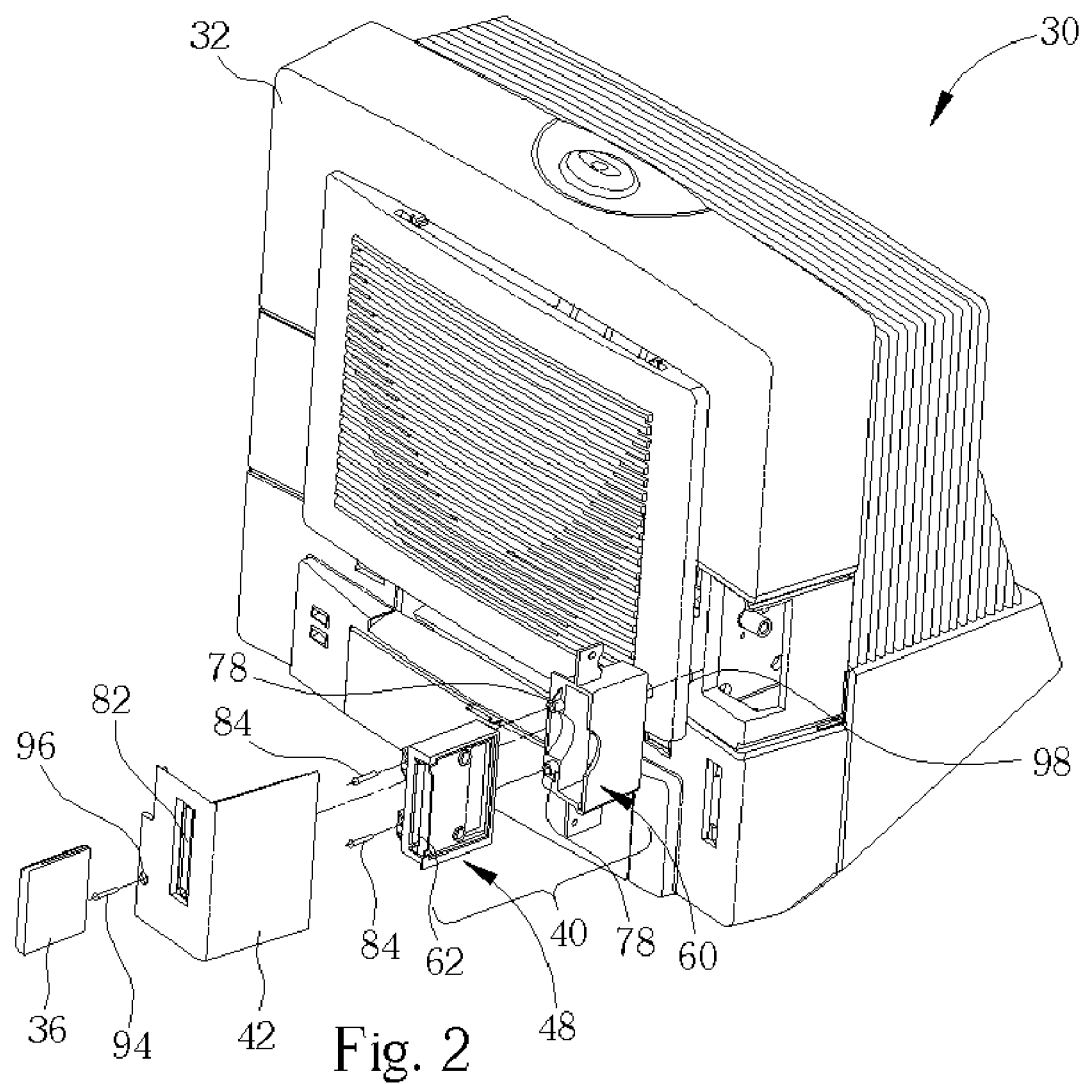
FIG. 2 is an external view of a photo printer according to the present invention.
Figure 3:
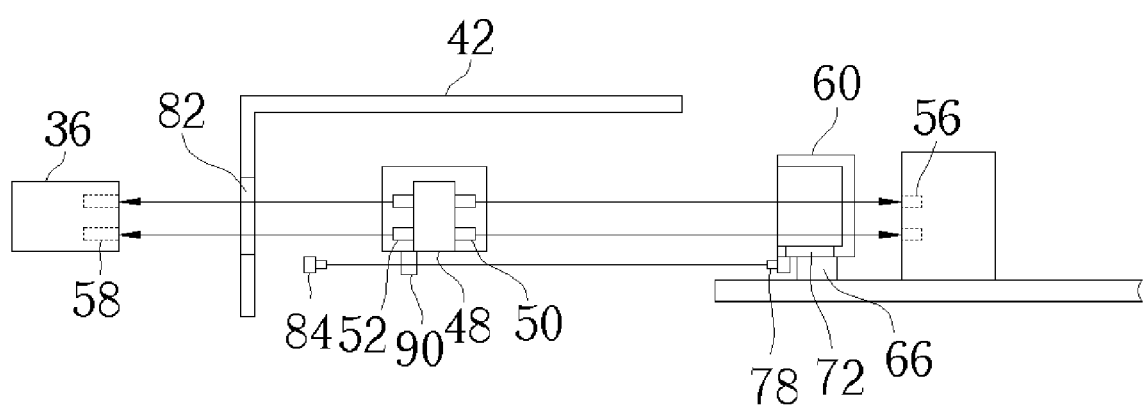
FIG. 3 is an internal schematic diagram of the photo printer depicted in FIG. 2.

Please refer to FIGS. 2 and 3. FIG. 2 is an external view of a photo printer according to the present invention. FIG. 3 is an internal schematic diagram of the photo printer 30 depicted in FIG. 2. The printer 30 comprises a housing 32, a circuit board 12 (not shown), a dust-preventive member 42, a connection module 40, and an external card 36. The circuit board 12 installed within the housing 32, comprises a first set of female conducting terminals 56 and a controller (not shown) for controlling the operation of the printer 30. The connection module 40 comprises an adapter 48 and a shell 60. The adapter 48 comprises a first set of male conducting terminals 50 for connecting with the first set of female conducting terminals 56 and a second set of male conducting terminals 52. The shell 60 is used for accommodating the adapter 48. The external card 36, such as a compact flash card or other familiar memory card, is used for storing data. The external card 36 comprises a second set of female conducting terminals 58 for engaging with the second set of male conducting terminals 52. The dust-preventive member 42 covering two sides of the shell 60 is used for preventing dust from drifting into the printer 30.

Figure 4:
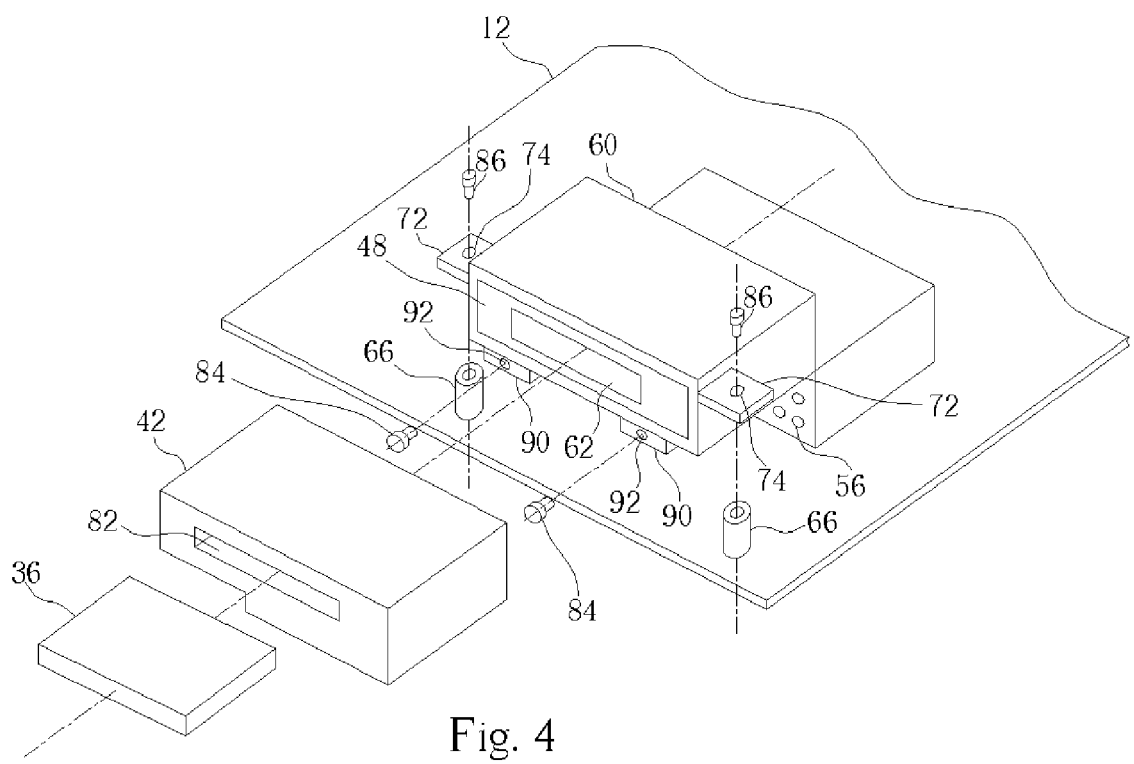
FIG. 4 is a diagram showing the connection module assembled on the circuit board according to the present invention.

In order to explain the connection relation between the connection module 40 and the external card 36 of this embodiment, please refer to FIGS. 2 to 4. FIG. 4 is diagram showing the connection module 40 assembled on the circuit board according to the present invention. The adapter 48 comprises two extending members 90 each with a first aperture 92. The shell 60 has two protrusions 72. The protrusions 72 are located on opposite sides of the shell 60 and each protrusion 72 has a second aperture 74. Two hollow protruding elements 78 set on two different sides of the shell 60, are used for accommodating two first screws 84 through the two first apertures 92, so that the adapter 48 is fixed on the shell 60. Two posts 66 set on the circuit board 12, are used for accommodating two second screws 86 through the two second apertures 74, so that the shell 60 can be fixed on the circuit board 12.

The entire installation is explained as follows. In the beginning, the adapter 48 can be positioned into the shell 60. They are then fixed by using two first screws 84 through the two first apertures 92 of the shell 60 and accommodated within the two hollow protruding element 78. Then, the first set of male conducting terminals 50 of the adapter 48 can be connected to the first set of female conducting terminals 56 of the circuit board 12. In order to prevent the damaging of the connection between the first set of male conducting terminals 50 and the first set of female conducting terminals 56 due to the weight of the adapter 48 and the shell 60, two second screws 86 which pass through the second apertures 74 of the protrusions 72 and are accommodated within the posts 66 on the circuit board 12, are used. As a result, the connection between the shell 60 and the circuit board 12 is improved, and also the two fixed posts 66 can share the weight of the adapter 48 and the shell 60 affecting the first set of male conducting terminals 50 and the female conducting terminals 56.

Please refer to FIG. 2 again. The dust preventive member 42 is covered onto the shell 60 and fixed to the housing 98 by using a third screw 94 through the third aperture 96 of the dust preventive member 42 to accommodate within the housing 98, after an assembly of the adapter 48, the shell 60 and the circuit board 12 is completed. Meanwhile, the first opening 62 of the adapter 48 corresponds to the second opening 82 of the dust-proof member 42. Finally, the user can connect the second set of female conducting terminals 58 of the external card 36 with the second set of male conducting terminals 52 of the adapter 48.

Figure 5:
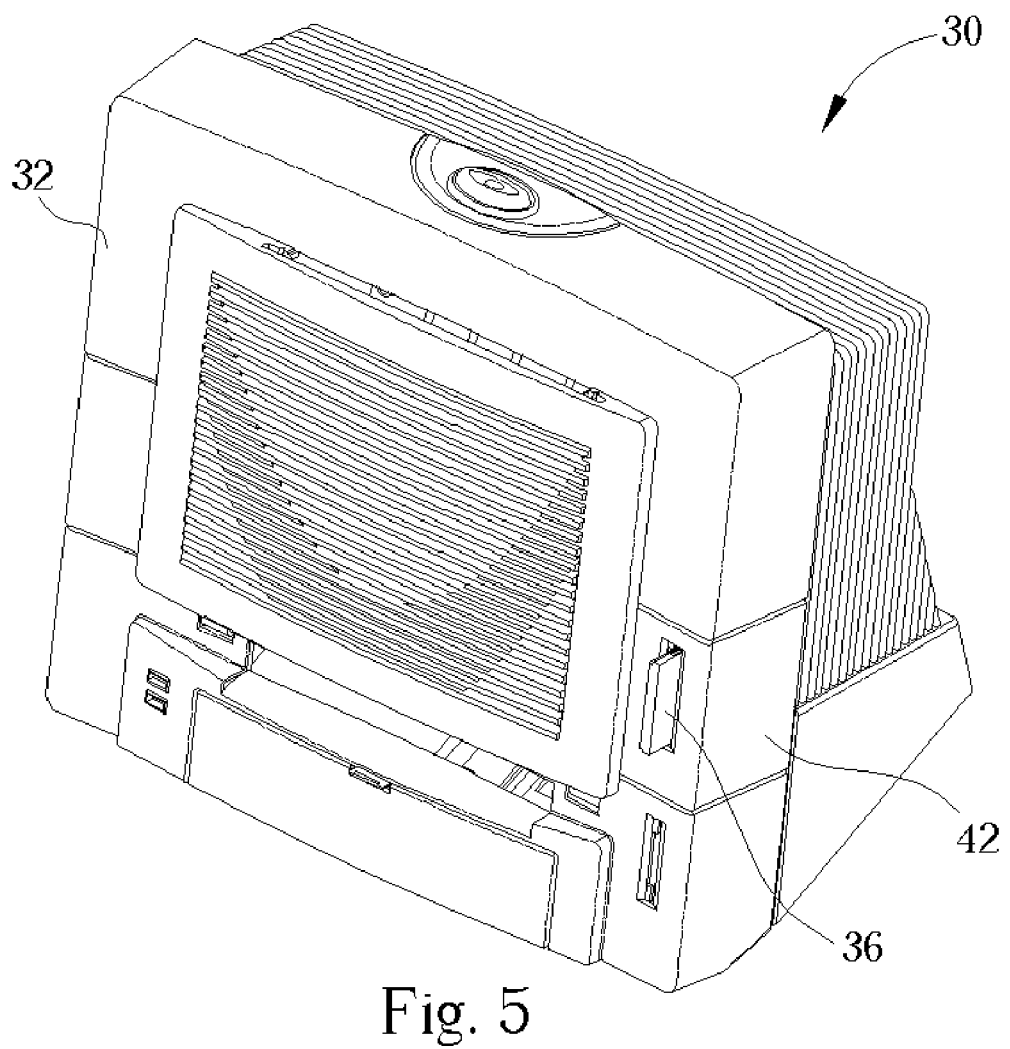
FIG. 5 is a diagram illustrating an external card positioned in the printer.

Please refer to FIG. 5, which illustrates an external card 36 positioned in the printer 30.

Even if the second set of male conducting terminals 52 of the connection module 40 are snapped due to force, the user can quickly take apart the dust-preventive member 42, the shell 60, and the adapter 48 in that order and then install a new adapter 48 all by himself.

In contrast to prior art, the present invention connection module comprises two sets of male conducting terminals, one for engaging with the first set of female conducting terminals of the circuit board, and the other for engaging with the second set of female conducting terminals of the external card. If the second set of male conducting terminals of the connection module is broken, the user is able to quickly take apart the connection module from the housing and replace it with another new connection module.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A photo printer comprising:
   a housing;
   a circuit board installed within the housing, comprising a control circuit for controlling an operation of the printer and a first set of female conducting terminals;
   a connection module comprising an adapter which comprises a first set of male conducting terminals for engaging with the first set of female conducting terminals, a second set of male conducting terminals; and a shell for accommodating the adapter;
   an external card for storing data, comprising a second set of female conducting terminals for engaging with the second set of male conducting terminals; and
   a dust=preventive member covering the shell for preventing dust from entering the photo printer.

2. The photo printer of claim 1 wherein the external card is a compact flash card.

3. The photo printer of claim 1 wherein the housing further comprises a cavity for containing an assembly of the adapter, the shell and the circuit board.

4. The photo printer of claim 3 wherein the dust-preventive member covers the assembly in the cavity and is fixed to the housing with a screw.

* * * * *